US006463296B1

(12) United States Patent
Esmailzadeh et al.

(10) Patent No.: US 6,463,296 B1
(45) Date of Patent: Oct. 8, 2002

(54) POWER CONTROL IN A CDMA MOBILE COMMUNICATIONS SYSTEM

(75) Inventors: Riaz Esmailzadeh, Yokohama (JP); Paul Peter Butovitsch, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/251,018

(22) Filed: Feb. 16, 1999

(51) Int. Cl.[7] ................................................. H04Q 7/20
(52) U.S. Cl. ..................... 455/522; 455/69; 455/245.1
(58) Field of Search ............................... 455/522, 442, 455/507, 69, 245.1, 226.2, 226.3, 517, 524, 526, 527, 67.1–67.3, 310–311, 316–318; 370/320, 318; 375/130, 147, 148, 227, 345

(56) References Cited

U.S. PATENT DOCUMENTS

| 5,265,119 A | * 11/1993 | Gilhousen et al. ........... 455/522 |
| 5,305,468 A | * 4/1994 | Bruckert et al. ............... 455/69 |
| 5,333,175 A | 7/1994 | Ariyavisitakul et al. ...... 379/58 |
| 5,574,747 A | * 11/1996 | Lomp ........................... 375/144 |
| 5,839,056 A | * 11/1998 | Hakkinen ..................... 455/69 |
| 5,878,350 A | * 3/1999 | Nakamura et al. ........... 455/442 |
| 5,893,035 A | * 4/1999 | Chen ............................ 455/522 |
| 5,960,361 A | * 9/1999 | Chen ............................ 455/522 |
| 5,995,496 A | 11/1999 | Honkasalo et al. ......... 370/318 |
| 6,058,107 A | * 5/2000 | Love et al. .................. 370/332 |
| 6,163,708 A | * 12/2000 | Groe ............................ 455/522 |
| 6,175,745 B1 | * 1/2001 | Bringby et al. ............. 455/522 |
| 6,178,193 B1 | * 1/2001 | Kondo ......................... 375/130 |
| 6,181,738 B1 | * 1/2001 | Chheda et al. ............... 375/224 |
| 6,185,432 B1 | * 2/2001 | Vembu ........................ 455/522 |
| 6,330,456 B1 | * 12/2001 | Heshem et al. ............. 455/522 |
| 6,343,218 B1 | * 1/2002 | Kaneda et al. .............. 455/522 |
| 6,347,083 B1 | * 2/2002 | Nishino ....................... 370/342 |

FOREIGN PATENT DOCUMENTS

| DE | 197 25 438 A1 | 12/1997 |
| EP | 0 762 668 A2 | 3/1997 |
| EP | 102673 | 10/1999 |
| WO | WO 97/02665 | 1/1997 |

OTHER PUBLICATIONS

Gao, et al: "PowerControl for Mobile DS/CDMA Systems Using a Modified Elman Neural Network Controller"; IEEE Vehicular Tech, Conf., Mar. 1997.*

* cited by examiner

Primary Examiner—William Trost
Assistant Examiner—Charles Craver
(74) Attorney, Agent, or Firm—Jenkens & Gilchrist, P.C.

(57) ABSTRACT

A method for controlling the power transmission levels in a spread spectrum or CDMA cellular system is disclosed, in which the decision to increase or decrease the transmission power level of a mobile station or base station, and the amount of any such increase or decrease made, is based on the weighted combination of a plurality of factors that indicate existing channel conditions. For example, the weight can be set according to the reliability of each channel condition factor involved.

23 Claims, 4 Drawing Sheets

POWER CONTROL IN A CDMA MOBILE COMMUNICATIONS SYSTEM

BACKGROUND OF THE INVENTION

1. Technical Field of the Invention

The present invention relates in general to the mobile communications field and, in particular, to a method for controlling transmission power levels in a spread spectrum or Code Division Multiple Access (CDMA) cellular communications system.

2. Description of Related Art

In wideband spread spectrum cellular communications systems (often referred to as Wideband-CDMA or W-CDMA systems), power control symbols are transmitted on a regular basis in order to compensate for the effects of changing conditions that influence the channel, such as fading and shadowing. For example, a serving base station can transmit a power control command, which signals a served mobile station to increase or decrease its transmission power level. The mobile station then decides whether to increase or decrease its transmission power level in response to the power control command received.

However, for a mobile station operating in a soft handoff (SOHO) mode, it commences communications with a new base station before terminating communications with the old base station. Consequently, the mobile station's transmission power level decisions have to be made based on the power control commands received from the two (or more) base stations that are serving the mobile station during the SOHO operation. Similarly, on the downlink, each base station can decide what transmission power level is needed for each served mobile station, based on the power control messages received from the served mobile stations. With this approach, the effects of changes to the channel conditions can be minimized.

When a mobile station is operating in a non-SOHO mode, the mobile station's decision about whether to increase or decrease its transmission power level can be based on the direction provided by the power control bit or symbol received from its serving base station. As such, as specified in the technical standards involved (e.g., the ARIB standards for Wideband-CDMA, and the IS-95 Standard: ANSI J-STD-008, pp. 2–137), the amount that the mobile station is directed to increase or decrease its transmission power level is a constant value.

A similar power control approach is taken on the downlink for base stations operating in a non-SOHO mode. A serving base station's decision about whether to increase or decrease its transmission power level is a hard decision, which is based directly on the detected power control bit or symbol transmitted from a specific served mobile station. However, in the proposed ETSI standard (for Europe), the amount that the serving base station will increase or decrease its transmission power level is variable, but not on a slot level. In other words, the network can select an "amount" for the base station to use, but once that amount is selected, it remains constant until the next change (e.g., triggered from a higher protocol level).

On the other hand, when a mobile station is operating in a SOHO mode, the decision about whether to increase or decrease its transmission power level is based on the power control bits or symbols received from the two (or more) base stations involved in the SOHO procedure. In accordance with the IS-95 standard, the mobile station will increase its transmission power level only when all of the base stations involved in the SOHO procedure convey a power increase command. However, if just one of those base stations transmits a power decrease command during a SOHO procedure, the mobile station is required to decrease its transmission power level. In any event, the mobile station's transmission power level is increased or decreased by a constant value.

Also, for W-CDMA systems, each base station involved with a mobile station in a SOHO procedure independently receives a power control bit or symbol from that mobile station. Therefore, each such base station can decide independently from the other base station(s) whether to increase or decrease its transmission power level for the mobile station involved, based on the power control bit or symbol received (and detected) from that mobile station.

A significant problem encountered when a base station or mobile station has to make a power control decision in a spread spectrum or CDMA cellular system is that it requires the base station or mobile station to make a so-called "hard" decision (i.e., evokes a precise response) based solely on the proper detection of a received power control bit or symbol. However, it is always possible that a received power control bit or symbol will be erroneously detected. Consequently, the existing power control approaches that require such a hard decision (based solely on the proper detection of a power control symbol) are not optimal approaches.

Furthermore, when operating in a SOHO mode, a hard decision by a mobile station to increase its transmission power level in response to power increase commands from all base stations involved in the SOHO procedure is also not an optimal decision, because the probability that at least one power control symbol has not been received or has been erroneously detected increases with the number of base stations involved. Nevertheless, as described in detail below, the present invention successfully resolves the above-described problems.

SUMMARY OF THE INVENTION

In accordance with the present invention, a method for controlling the power transmission levels in a spread spectrum or CDMA cellular system is provided whereby the decision made to increase or decrease the transmission power level of a mobile station or base station, and the amount of any such increase or decrease made, is based on the weighted combination of a plurality of factors that indicate existing channel conditions. In a preferred embodiment of the present invention, the weight is set according to the reliability of each channel condition factor involved in making the power control decision.

An important technical advantage of the present invention is that an optimal power control decision can be made by a base station or mobile station in a spread spectrum or CDMA system based on all channel condition information available.

Another important technical advantage of the present invention is that it provides a better solution for existing power control problems in SOHO situations than provided by conventional approaches.

Still another important technical advantage of the present invention is that it provides a more efficient method for setting system power control parameters in spread spectrum or CDMA systems.

Yet another important technical advantage of the present invention is that it optimizes the utilization of available radio resources in a spread spectrum or CDMA system, such as transmission power, system capacity, etc.

Still another important technical advantage of the present invention is that it provides an optimal method for making power control decisions in a spread spectrum or CDMA system, which gives due consideration to such factors as perceived channel conditions and power control statistics.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–4 of the drawings, like numerals being used for like and corresponding parts of the various drawings.

Essentially, in accordance with the present invention, a method for controlling power transmission levels in a spread spectrum or CDMA cellular system is provided whereby the decision to increase or decrease the transmission power level of a mobile station or base station, and the amount of any such increase or decrease made, is based on the weighted combination of a plurality of factors that indicate existing channel conditions or value of previous power control commands. In a preferred embodiment of the invention, the weight is set according to the reliability of each channel condition factor involved.

Figure 1:
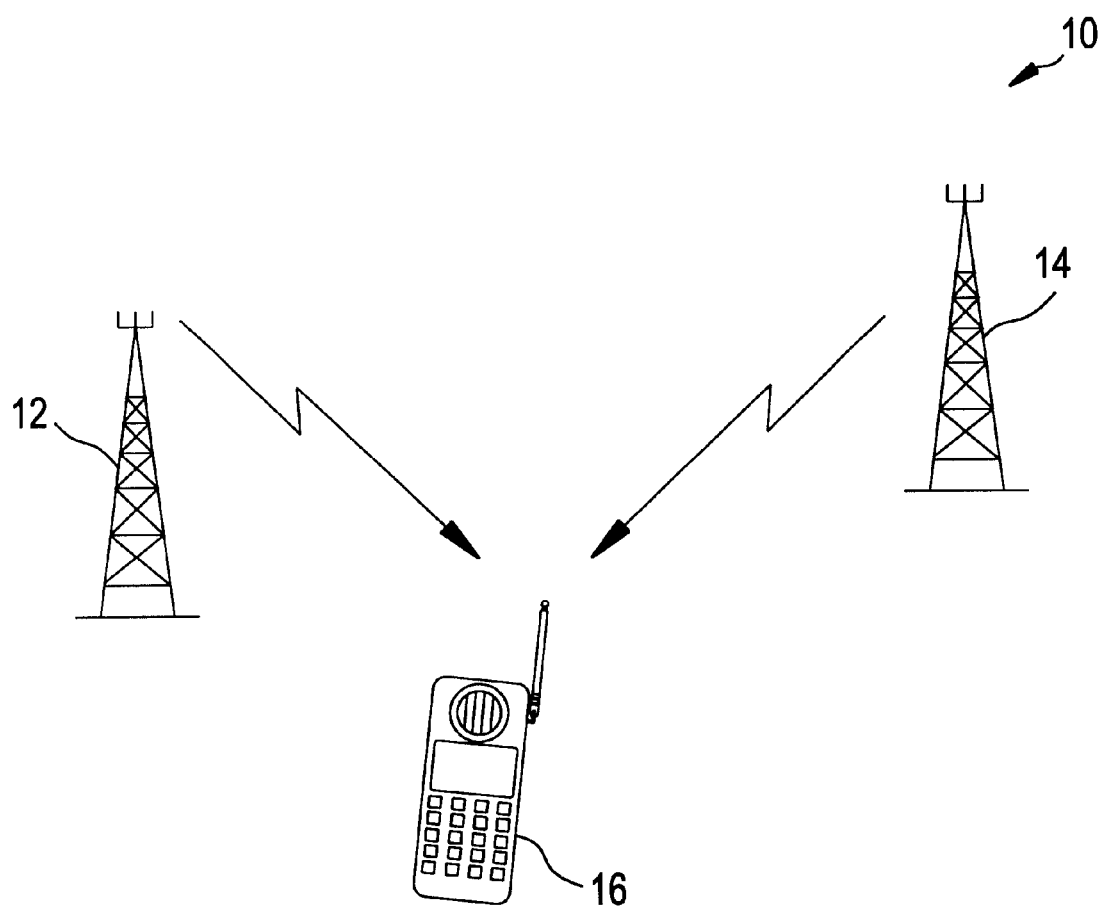
FIG. 1 is a simplified diagram of a section of an exemplary spread spectrum or CDMA cellular system, which can be used to implement the present invention.

Specifically, FIG. 1 is a simplified diagram of a section of an exemplary spread spectrum or CDMA cellular system 10, which can be used to implement the present invention. Notably, however, although the exemplary cellular system 10 shown in FIG. 1 is described in the context of a spread spectrum system operating in accordance with the IS-95 standards, the invention is not intended to be so limited. For example, the present concept of making a power control decision based on a weighted combination of existing channel condition factors can be applied to any appropriate type of mobile communications system where base station and/or mobile station power control decisions should be optimized (e.g., W-CDMA system, etc.).

The exemplary system 10 includes a plurality of base stations (e.g., 12 and 14) and mobile stations (e.g., 16). In this embodiment, each base station (12, 14) defines a cell, but it can also define a sector within a cell. In a different type of cellular system, these transmitter/receiver base stations may be referred to, for example, as fixed transceivers or base transceiver stations. Also, the mobile stations may be alternatively referred to as mobile terminals and can include, for example, the class of portable transceiver units (e.g., handheld or vehicle-installed radiotelephones).

In accordance with the preferred embodiment of the present invention, the base stations (e.g., 12, 14) and mobile stations (e.g., 16) each periodically transmit a power control symbol on a forward or reverse traffic channel, respectively. Each power control symbol is intended to signal the receiving unit (e.g., mobile station on the forward traffic channel, and base station on the reverse traffic channel) to increase or decrease its transmission power level. As such, at the receiving side, this detected power control symbol can be used as one factor out of a plurality of factors which indicate the traffic channel conditions existing at that time.

A number of other factors that can be measured, calculated and/or used by a base station (e.g., 12, 14) or mobile station (e.g., 16) to determine existing traffic channel conditions are: the transmission power level used in a previous interval; the Signal-to-Interference Ratio (SIR) of the received signal; the Euclidean distance that received pilot symbols (received by a mobile station) are away from their expected position in the received signal space or constellation; fading statistics for the channel involved; prior transmission power level increments; number of transmission paths in the channel and respective average power for each path; whether or not interference cancellation is in use at the receiving base station or mobile station; delay in the power control loop; priority of the received signal and subscriber grade; circuit- or packet-switched service (type of service); SOHO mode or non-SOHO mode (e.g., although presently not used, in SOHO mode considering factors for all units involved, considering length of time in SOHO mode, a mobile station could determine which base station is ineffective in SOHO and set the power control request to that base station accordingly). As such, this list of channel condition factors that can be used for power control decisions is exemplary and not intended to be exhaustive.

In preparing to make a transmission power control decision for a subsequent transmission interval (e.g., once every 1.25 ms interval on an IS-95 CDMA forward or reverse traffic channel), a base station (12, 14) or mobile station (16) calculates for itself a transmission power setting (increase or decrease, and by what "amount" or variable as described earlier) based on the weighted combination of some or all of the measured or calculated channel condition factors available. In the preferred embodiment, the weighting factor used is based on the reliability of the measured or calculated channel condition factors. Also, the transmission power control decision made by a base station or mobile station can be advantageously used for a subsequent transmission power setting regardless of whether or not the base station or mobile station is operating in a SOHO mode.

Figure 2:
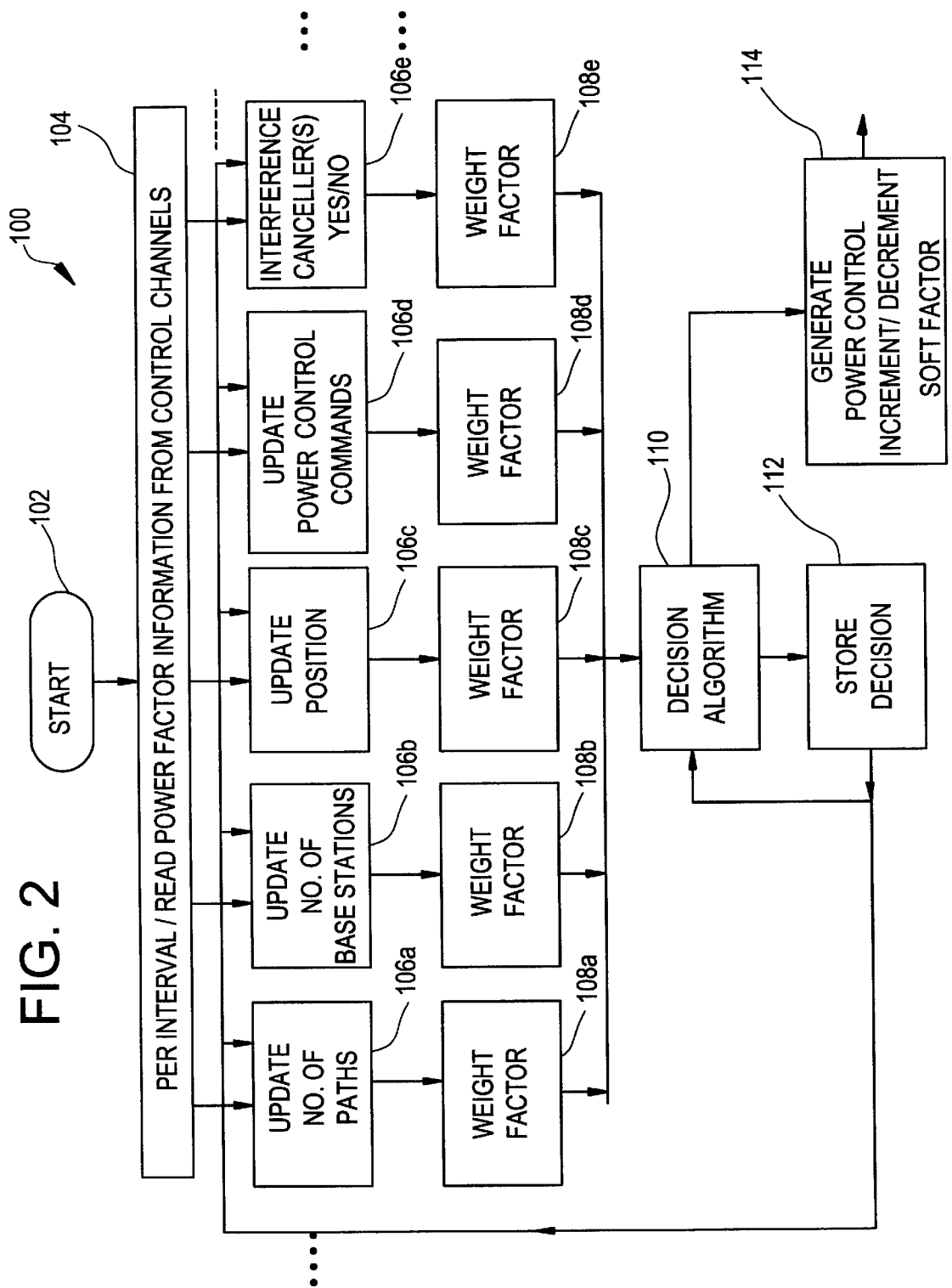
FIG. 2 is a flow diagram of an exemplary method that can be used by a mobile station in a spread spectrum or CDMA communications system to implement the preferred embodiment of the present invention.

FIG. 2 is a flow diagram of an exemplary method 100 that can be used by a mobile station in a spread spectrum or CDMA communications system to implement the preferred embodiment of the present invention. Again, although the exemplary method illustrates how a mobile station can make a transmission power control decision in a SOHO mode, the invention is not so limited and can be applied in any mobile communications environment where mobile station or base station transmission power control decisions should be optimized.

At step 104 of the exemplary transmission power control method, the mobile station (e.g., 16) reads in or deduces pertinent transmission power factor information from signalling messages received on the forward traffic channel and/or downlink control channel. For this illustrative embodiment, this power factor information includes the number of transmission paths in the channel, number of base stations involved (e.g., two—12 and 14 in a SOHO mode), the Euclidean distance of received pilot symbols from their expected positions, power control commands (symbols or bits), and whether or not interference cancellation is being used at the base station(s) involved. At step 106, the mobile station stores this information in local memory as updates to similar information stored in prior intervals.

At step 108, the mobile station assigns a weight to each power transmission factor updated at step 106. For this embodiment, each weight is assigned according to a perceived reliability for the respective power transmission factor. As such, the resulting weight for a given factor can be expressed as a percentage, with full weight expressed as 100%, and no weight expressed as "zero". For example, the number of base stations involved 108b (e.g., 2) is reliable information for the mobile station, and can thus be given the full weight at 100% (likewise for the interference cancellation information 108e). On the other hand, the weight to be given to the number of transmission paths (108a) or pilot symbol positions (108c) would be based on less reliable information, and the weight thus assigned to each would be proportionately lower. As such, the actual weight to be assigned to any one factor could be determined based on design considerations for the specific communications system involved.

At step 110, the mobile station combines the weight factors assigned at step 108. For example, a conventional neural network algorithm can be implemented by the mobile station's local processor to consider all of the weight factors and produce an overall power control decision parameter for the mobile station's next transmission interval. At the simplest level, the mobile station could algebraically combine the weight factors assigned at step 108 to produce a single number, which could then be used to select a power control factor from, for example, a look up table. At step 112, the mobile station stores the latest power control decision parameter produced at step 110 in local memory. Preferably, the same information is fed back as an input to the decision algorithm (110) and for each update performed at step 106, in order to bias each weight factor and thus improve the overall efficiency and accuracy of the decision process. At step 114, the mobile station generates and stores an internal power control command, which ultimately directs the mobile station's transmitter section to increase or decrease the transmission power level for the next interval and by what amount. In other words, since the transmission power control decision made at step 110 produces a number from within a broad range of numbers (e.g., 1–100), that number can be used as an absolute value to determine the transmission power level setting for the next interval.

The decision algorithm (110) shown in FIG. 2 can be implemented in a number of ways. For example, in one embodiment, a majority decision can be used to determine whether a mobile station (e.g., 16) is to increase or decrease its transmission power level during a SOHO procedure. In other words, if two out of a total of three base stations involved in the SOHO procedure transmit an order for the mobile station to increase its transmission power level, in accordance with the decision algorithm 110, at step 114, the mobile station will increase its transmission power level by x dB (e.g., with the value of "x" determined by the combination of weight factors 108 involved). Otherwise, the mobile station will decrease its transmission power level by y dB.

In another exemplary embodiment, if all BSs (e.g., "m" BSs) order a mobile station (e.g., 16) to increase its transmission power level, in accordance with the decision algorithm 110, the mobile station will increase its transmission power level by x dB. Similarly, if all BSs order a decrease in transmission power, the mobile station will decrease its transmission power level by y dB. However, if n base stations (out of the m total base stations) order the mobile station to decrease its transmission power level, while the other (m-n) base stations maintain their orders for the mobile station to increase its transmission power level, in accordance with the decision algorithm 110, the mobile station will set the amount of its increment to $$\left(\frac{m-n}{m}\right)x - \left(\frac{n}{m}\right)y$$

dB. Preferably, for this embodiment, this same procedure is applied by the decision algorithm 110 for each transmission interval.

Figure 3:
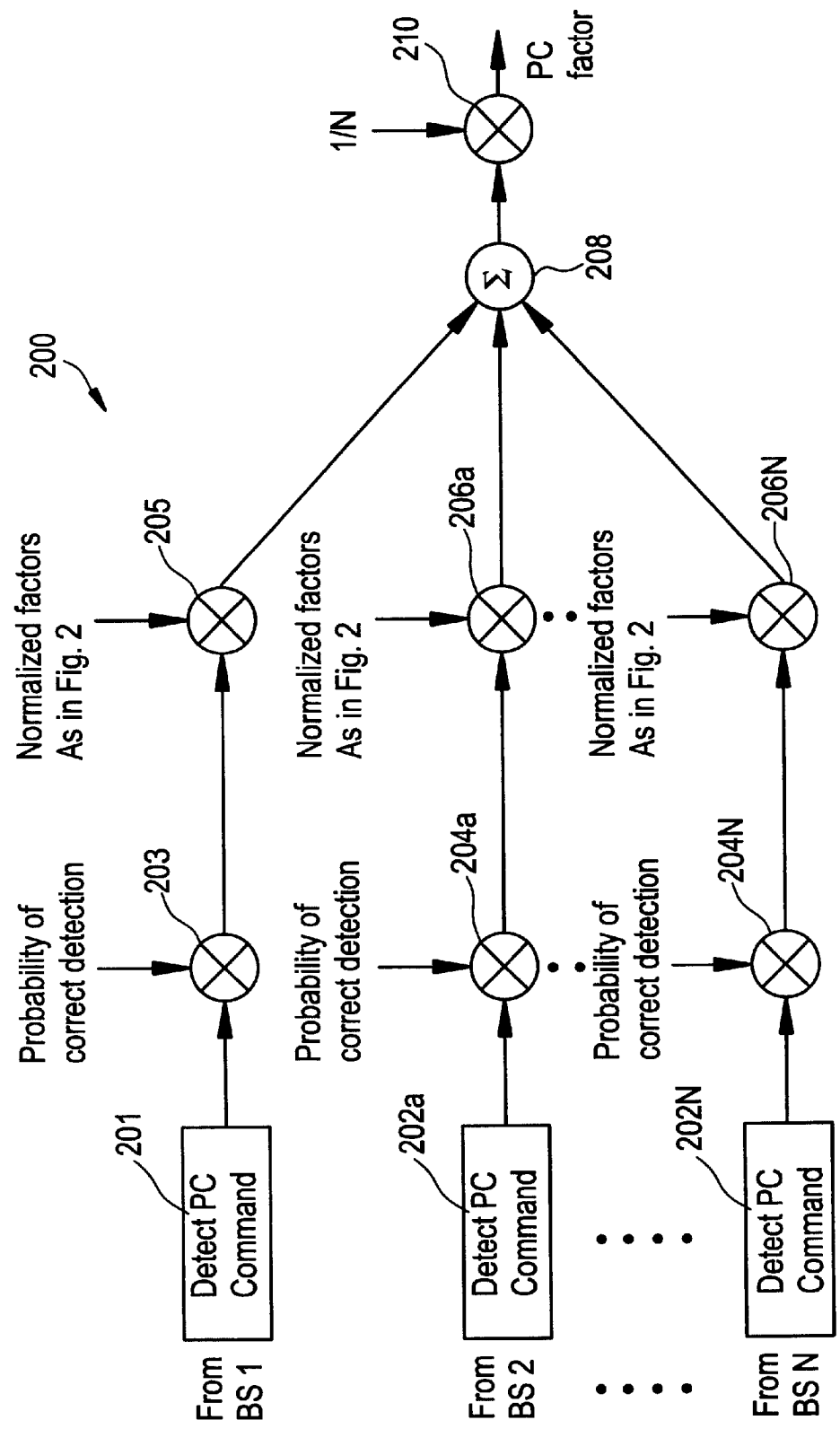
FIG. 3 is a schematic diagram of exemplary logic that can be used to implement the decision algorithm shown in FIG. 2 in a mobile station, in accordance with the preferred embodiment of the present invention.

FIG. 3 is a schematic diagram of exemplary logic (200) that can be used to illustrate how the decision algorithm 110 shown in FIG. 2 can be implemented by a processor in a mobile station (e.g., 16). Note that the present invention can also be implemented on the network side (e.g., in a base station). For this embodiment, referring to FIGS. 2 and 3, a plurality of base stations (e.g., $BS_1$–$BS_N$) periodically transmit a power control command (e.g., symbol) on a forward traffic channel, which is intended to signal the receiving unit (mobile station) to increase or decrease its transmission power level. The intended mobile station detects the plurality of power control commands (201–202$_N$). For each received power control command, the mobile station determines (using a conventional detection technique) the probability that the power control command was correctly detected (203–204$_N$). For each detected power control command, the mobile station assigns a weight (e.g., based on one or more normalized factors $205$–$206_N$). The mobile station then combines (e.g., algebraically adds) the weighted power control factors (208), and divides (210) the resulting value by the number of base stations involved. The mobile station uses the resulting power control factor to determine the transmission power level setting to be used for the next interval.

Figure 4:
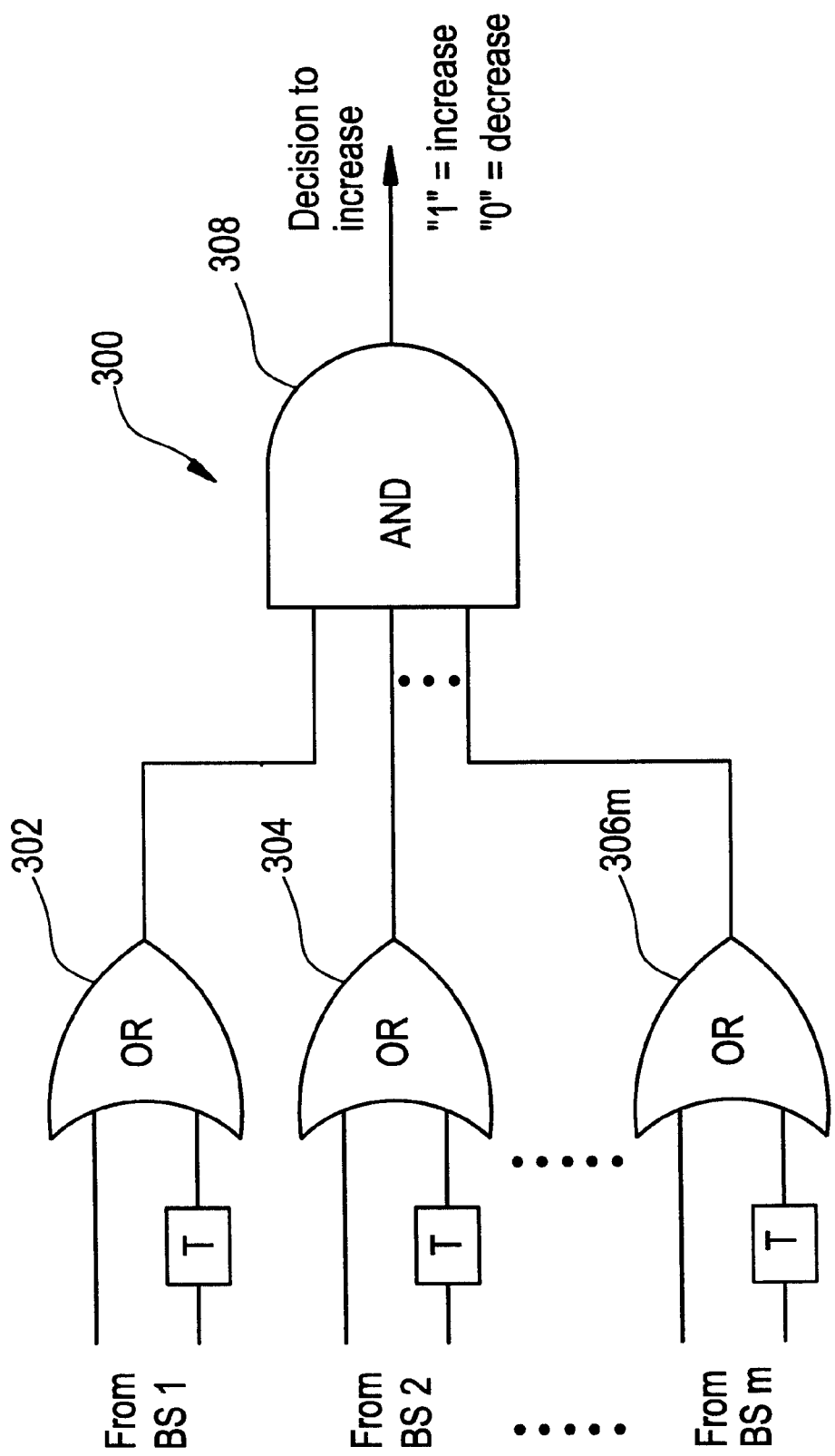
FIG. 4 is a schematic diagram of exemplary logic that can be used to illustrate how the decision algorithm shown in FIG. 2 can be implemented, in accordance with a second embodiment of the present invention.

FIG. 4 is a schematic diagram of exemplary logic (300) that can be used to illustrate how the decision algorithm 110 shown in FIG. 2 can be implemented in a mobile station (e.g., 16), in accordance with a second embodiment of the present invention. For this embodiment, the logic (algorithm) 300 includes a first OR gate 302, a second OR gate 304, and a plurality of OR gates (306$_{1-m}$). Each OR gate (302–306m) includes a pair of input connections and an output connection. Each pair of input connections receives transmission power level command signals from a respective base station. One connection, "T", of each pair of input connections provides the previous transmission power level command signal received from the respective base station involved, while the second input connection of each pair provides the latest (present) transmission power level command signal received from the respective base station involved. In other words, each OR gate takes into account two commands received from the respective base station involved, the present command and the previous command. As such, the output of each OR gate 302–306m is coupled to an input of an AND gate 308. Consequently, if both inputs to an OR gate 302–306m have had command signals from the respective base station for a decrease in the mobile station's transmission power level, then the output signal from the AND gate 308 is a "0" (which is a power level "decrease" decision for the mobile station). On the other hand, if all the "m" base stations have ordered an increase (in a present or previous order), then the output of the AND gate 308 is a "1" (which is a power level increase decision for the mobile station).

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for making a transmission power control decision in a mobile communications system, comprising the steps of:

receiving a plurality of different types of traffic channel condition factors;

assigning a weight to each of said plurality of traffic channel condition factors, considering reliability of each said traffic channel condition factor;

combining said plurality of traffic channel condition factors into a weighted combination after said step of assigning said weights; and making said transmission power control decision based on said weighted combination.

2. The method of claim 1 including the step of storing said plurality of different types of traffic channel condition factors, wherein said weight is assigned between zero and a hundred percent according to a reliability value for each of said plurality of different types of channel condition factors.

3. The method of claim 2, wherein the steps are performed by a mobile station operating in a soft-handoff mode.

4. The method of claim 1, wherein said plurality of different types of traffic channel condition factors includes a transmission power level of a prior interval.

5. The method of claim 1, wherein said plurality of different types of traffic channel condition factors includes a detected power control symbol.

6. The method of claim 1, wherein said plurality of different types of traffic channel condition factors includes a signal-to-interference ratio for a received signal.

7. The method of claim 1, wherein said plurality of different types of traffic channel condition factors includes a plurality of prior transmission power increment values.

8. The method of claim 1, wherein the transmission power control decision is made at a mobile station.

9. The method of claim 1, wherein the transmission power control decision is made at a base station.

10. The method of claim 1, wherein said mobile communications system comprises a CDMA system.

11. The method of claim 1, further comprising the step of setting a transmission power level based on said transmission power control decision.

12. The method of claim 1, wherein the transmission power control decision making process is performed using a neural network algorithm.

13. A system for making a transmission power control decision in a mobile communications system, comprising:

a mobile station; and at least one base station coupled to said mobile station by a radio link, at least one of said mobile station and said at least one base station being configured to be operable to:

receive a plurality of different types of traffic channel condition factors;

assign a weight to each of said plurality of different types of channel condition factors, considering reliability of each said traffic channel condition factor;

combine said plurality of traffic channel condition factors into a weighted combination after said step of assigning said weights; and make said transmission power control decision based on said weighted combination.

14. The system of claim 13, wherein said weight is assigned according to a reliability value between zero and a hundred percent for each of said plurality of different types of channel condition factors.

15. The system of claim 14, wherein said mobile station is operating in a soft-handoff mode.

16. The system of claim 13, wherein said plurality of different types of traffic channel condition factors includes a transmission power level of a prior interval.

17. The system of claim 13, wherein said plurality of different types of traffic channel condition factors includes a detected power control symbol.

18. The system of claim 13, wherein said plurality of different types of traffic channel condition factors includes a signal-to-interference ratio for a received signal.

19. The system of claim 13, wherein said plurality of different types of traffic channel condition factors includes a plurality of prior transmission power increment values.

20. The system of claim 13, wherein the transmission power control decision is made at said mobile station.

21. The system of claim 13, wherein the transmission power control decision is made at said at least one base station.

22. The system of claim 13, wherein said mobile communications system comprises a CDMA system.

23. The system of claim 13, wherein said mobile station and said at least one base station are further operable to set a transmission power level based on said transmission power control decision.

* * * * *

UNITED STATES PATENT AND TRADEMARK OFFICE
CERTIFICATE OF CORRECTION

PATENT NO.   : 6,463,296 B1
DATED        : October 8, 2002
INVENTOR(S)  : Riaz Esmailzadeh et al.

It is certified that error appears in the above-identified patent and that said Letters Patent is hereby corrected as shown below:

Column 6,
Line 31, replace "factors $^{205-206}{}_N$)." with -- factors $205\text{-}206_N$). --

Signed and Sealed this

Twenty-second Day of April, 2003

JAMES E. ROGAN
*Director of the United States Patent and Trademark Office*